(12) United States Patent
Nakao et al.

(10) Patent No.: US 12,424,868 B2
(45) Date of Patent: Sep. 23, 2025

(54) CONTROL DEVICE, POWER CONVERSION SYSTEM, POWER SUPPLY DEVICE, COMPUTER-READABLE STORAGE MEDIUM, AND CONTROL METHOD

(71) Applicant: NExT-e Solutions Inc., Tokyo (JP)

(72) Inventors: Fumiaki Nakao, Shizuoka (JP); Takashi Yagi, Chiba (JP)

(73) Assignee: NExT-e Solutions Inc., Tokyo (JP)

( * ) Notice: Subject to any disclaimer, the term of this patent is extended or adjusted under 35 U.S.C. 154(b) by 0 days.

(21) Appl. No.: 18/669,544

(22) Filed: May 21, 2024

(65) Prior Publication Data
US 2024/0388121 A1  Nov. 21, 2024

Related U.S. Application Data

(63) Continuation of application No. PCT/JP2022/043062, filed on Nov. 21, 2022.

(30) Foreign Application Priority Data

Nov. 22, 2021 (JP) .................... 2021-189665

(51) Int. Cl.
*H02J 7/35* (2006.01)
*H02J 3/00* (2006.01)
(Continued)

(52) U.S. Cl.
CPC ............. *H02J 7/35* (2013.01); *H02J 3/004* (2020.01); *H02J 3/32* (2013.01); *H02J 7/0048* (2020.01);
(Continued)

(58) Field of Classification Search
CPC ...... H02J 7/35; H02J 3/004; H02J 3/32; H02J 7/0048; H02J 7/00712; H02J 2300/24;
(Continued)

(56) References Cited

U.S. PATENT DOCUMENTS 7,608,937 B1 * 10/2009 Altenschulte .......... H02J 3/381
290/44
2019/0214845 A1 * 7/2019 Hausman, Jr. ............ E06B 9/38
(Continued)

FOREIGN PATENT DOCUMENTS

JP    2017195728 A    10/2017
JP    2020137293 A    8/2020

OTHER PUBLICATIONS

General Incorporated Foundation New Energy Foundation, "New Energy Award 2019, New Energy Foundation Chairman's Award, Introductory Activities Category: Introduction of a large power storage battery system with measures taken to mitigate a short-period output fluctuation" (online), Searched on Nov. 16, 2021, Internet <https://www.nef.or.jp/award/kako/r01/b_04.html>.
(Continued)

*Primary Examiner* — John W Poos

(57) ABSTRACT

A control apparatus for controlling output power, which is power outputted by a power supply apparatus to a power grid, includes an output control unit which causes the power supply apparatus to operate in any one mode of (i) a first mode in which magnitude of the output power is increased such that an absolute value of a fluctuation rate indicating a ratio of a fluctuation amount of the output power per unit time to a rated output of the power supply apparatus is equal to or smaller than a first threshold value or smaller than the first threshold value, (ii) a second mode in which the magnitude of the output power is decreased such that the absolute value of the fluctuation rate is equal to or smaller than a second threshold value or smaller than the second threshold value, and (iii) a third mode in which the magnitude of the output power is maintained such that the absolute value of the fluctuation rate is equal to or smaller than a third threshold value or smaller than the third threshold value.

20 Claims, 12 Drawing Sheets

(51) Int. Cl.
*H02J 3/32* (2006.01)
*H02J 7/00* (2006.01)

(52) U.S. Cl.
CPC ....... *H02J 7/00712* (2020.01); *H02J 2300/24* (2020.01)

(58) Field of Classification Search
CPC .......... H02J 3/381; H02J 3/46; H02J 2300/30; H02J 3/38; H02J 7/0063; H02J 7/0013; H02J 7/0047; H02J 7/0068; H02J 7/34; H02J 7/007182; H02J 7/345; H02J 9/061; H02J 11/00; H02J 2310/18; H02J 7/16; H02J 7/1492; H02J 3/00125; H02J 13/00034; H02J 13/00004; H02J 3/16; H02J 7/00308; H02J 3/36; H02J 13/00; H02J 3/40; H02J 2310/60; H02J 7/04

USPC ........................ 307/24, 153, 20, 39, 151, 82
See application file for complete search history.

(56) References Cited

U.S. PATENT DOCUMENTS

2019/0296575 A1* 9/2019 Yang ........................ B60L 53/00
2021/0066912 A1* 3/2021 Mitsunaga ........ H02J 7/007194
2021/0079888 A1* 3/2021 Ye .............................. F03D 7/00

OTHER PUBLICATIONS

International Search Report and Written Opinion (ISA/237) of the International Search Authority for International Patent Application No. PCT/JP2022/043062, mailed by the Japan Patent Office on Feb. 14, 2023.

* cited by examiner

CONTROL DEVICE, POWER CONVERSION SYSTEM, POWER SUPPLY DEVICE, COMPUTER-READABLE STORAGE MEDIUM, AND CONTROL METHOD

BACKGROUND

1. Technical Field

The present invention relates to a control apparatus, a power conversion system, a power supply apparatus, a computer-readable storage medium, and a control method.

2. Related Art

Non-Patent Document 1 discloses a technology to mitigate a short-period output fluctuation in photovoltaic power generation by controlling charge and discharge of a power storage battery through a high-speed arithmetic operation in milliseconds by using a power storage battery control system.

PRIOR ART DOCUMENT

Non-Patent Document 1

General Incorporated Foundation New Energy Foundation, "New Energy Award 2019, New Energy Foundation Chairman's Award, Introductory Activities Category: Introduction of a large power storage battery system with measures taken to mitigate a short-period output fluctuation" (online), Searched on Nov. 16, 2021, Internet <URL:https://www.nef.or.jp/award/kako/r01/b_04.html>

Technical Problem

According to a prior art, power storage battery equipment is connected to an output side of a first power conditioner connected to a solar power generation module, via a second power conditioner. Adjusting an output of the second power conditioner in response to an output fluctuation of the first power conditioner requires an expensive control system capable of processing a complex arithmetic operation at high speed. In addition, delay associated with an arithmetic operation and output adjustment makes it difficult to accurately control the output fluctuation.

DESCRIPTION OF EXEMPLARY EMBODIMENTS

Figure 1:
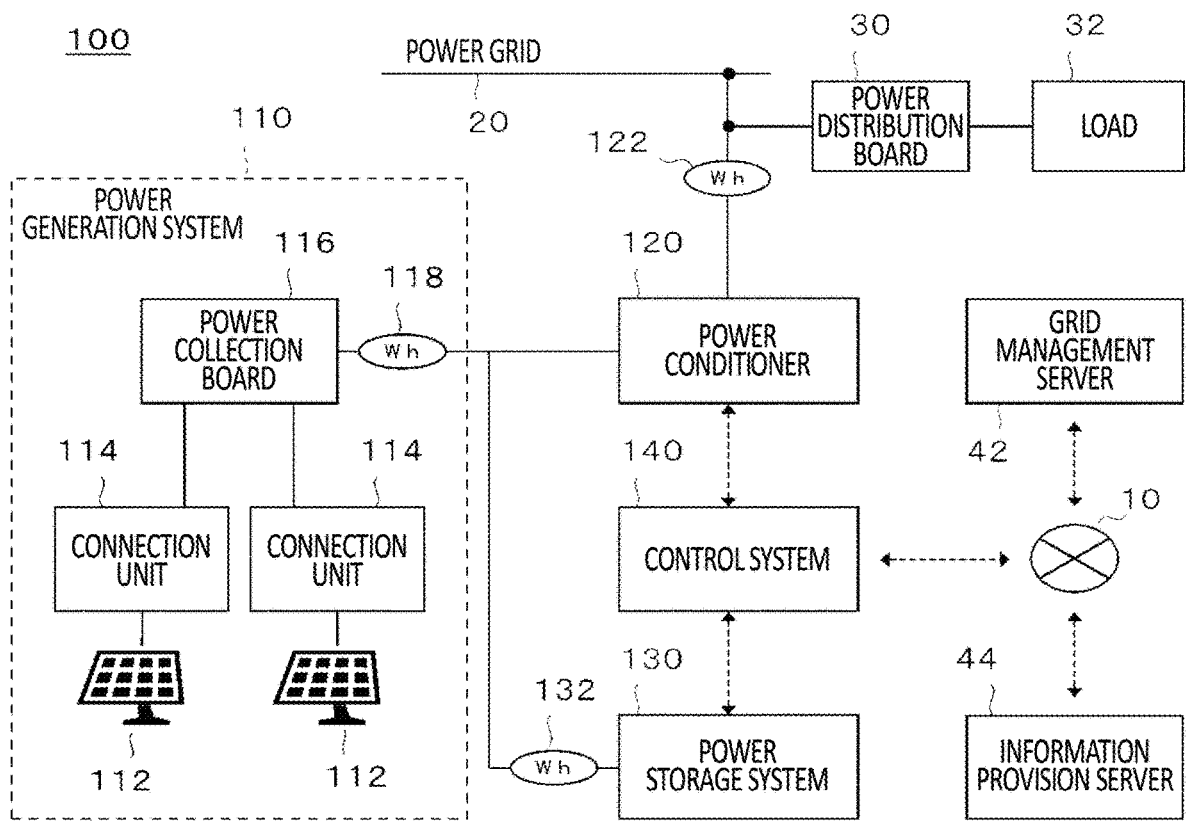
FIG. 1 schematically shows one example of a system configuration of a power supply system 100.

Hereinafter, the present invention will be described through embodiments of the invention, but the following embodiments do not limit the invention according to claims. In addition, not all of the combinations of features described in the embodiments are imperative to the solving means of the invention. It should be noted that in the drawings, the same or similar parts are assigned with same reference signs, and duplicated descriptions may be omitted.

(Overview of Power Supply System 100).

FIG. 1 schematically shows one example of a system configuration of a power supply system 100. In the present embodiment, the power supply system 100 includes, for example, a power generation system 110, a power conditioner 120, a power storage system 130, and a control system 140. The power supply system 100 may include a power amount meter 122 and a power amount meter 132. In the present embodiment, the power generation system 110 has, for example, one or a plurality of (which may be referred to as one or more) photovoltaic power generation panels 112, one or more connection units 114, a power collection board 116, and a power amount meter 118.

In the present embodiment, the power supply system 100 will be described in detail by taking, as an example, a case where the power conditioner 120 of the power supply system 100 is electrically connected to a power grid 20 and a power distribution board 30. This allows alternating current power to be supplied from the power supply system 100 to the power grid 20 via the power conditioner 120. In addition, this allows the alternating current power to be supplied from the power supply system 100 to one or more loads 32 via the power conditioner 120 and the power distribution board 30.

It should be noted that a phrase 'electrically connected' is not limited to a case where a specific component is directly connected to another component. There may be a third component lying between a specific component and another component. In addition, the phrase is not limited to a case where a specific component is physically connected to another component. For example, input winding and output winding in a transformer are not physically connected but are electrically connected to each other.

In addition, in the present embodiment, the power supply system 100 will be described in detail by taking, as an example, a case where the control system 140 of the power supply system 100 sends and receives information to and from a grid management server 42 and an information provision server 44 via a communication network 10. This allows the power supply system 100 to obtain a variety of information such as information regarding management of the power grid 20 or weather information.

In the present embodiment, the power supply system 100 causes direct current power to be generated in the power generation system 110, and converts the direct current power into the alternating current power in the power conditioner 120. In addition, the power supply system 100 outputs power to the power grid 20 (which may be referred to as power sale). In the present embodiment, the power supply system 100 utilizes the power conditioner 120 and the power storage system 130, to suppress a fluctuation in the power outputted by the power supply system 100 to the power grid 20 (which may be referred to as output power).

Specifically, the power conditioner 120 controls the output power such that a fluctuation rate of the output power, which will be described later, is equal to or smaller than a predetermined value or smaller than the predetermined value. The fluctuation rate of the output power indicates a ratio of a fluctuation amount per unit time (which is, for example, a fluctuation amount per minute (kW/minute)) of the output power (kW) to a rated output (kW) of the power supply system 100. The fluctuation rate of the output power may be a fluctuation rate per minute (%/minute).

The rated output of the power supply system 100 is determined based on, for example, a contract for the power supply system 100 to supply power to the power grid 20 (which may be referred to as a power sale contract). In one embodiment, the rated output of the power supply system 100 is determined based on maximum power (kW) received by a power grid stipulated in the power sale contract. In another embodiment, the rated output of the power supply system 100 is determined based on a planned supply amount notified to a power supply system 100 side based on the power sale contract. The rated output of the power supply system 100 may be determined based on a maximum output (kW) that can be outputted by the power supply system 100.

In addition, in the present embodiment, the power storage system 130 is arranged on an input side of the power conditioner 120. This allows the power supply system 100 to suppress a fluctuation in the output power without controlling charge and discharge of a power storage battery through a complex high-speed arithmetic operation as in the prior art. In addition, the power supply system 100 can accurately suppress the fluctuation in the output power with a relatively simple configuration. For example, the power supply system 100 can control the fluctuation rate of the output power of the power supply system 100 to be equal to or smaller than 5%/minute, or equal to or smaller than 1%/minute.

(Overview of Each Unit Related to Power Supply System 100)

In the present embodiment, the communication network 10 is used to convey information. The communication network 10 may be a transmission path for wired communication, may be a transmission path for wireless communication, or may be a combination of the transmission path for wireless communication and the transmission path for wired communication. The communication network 10 may include a wireless packet communication network, Internet, a P2P network, a dedicated line, a VPN, a power line communication line, or the like. The communication network 10 (i) may include a mobile communication network such as a mobile phone network, or (ii) may include a wireless communication network such as a wireless MAN (which is, for example, WiMAX (registered trademark)), a wireless LAN (which is, for example, Wi-Fi (registered trademark)), Bluetooth (registered trademark), Zigbee (registered trademark), or Near Field Communication (NFC).

In the present embodiment, the power grid 20 supplies power to a consumer (not shown in the figure). In the present embodiment, the power distribution board 30 receives power from the power grid 20 or the power conditioner 120, and distributes the power to the one or more loads 32 electrically connected to the power distribution board 30. In the present embodiment, the load 32 utilizes power. Examples of the load 32 include various electrical products.

In the present embodiment, the grid management server 42 manages the power grid 20. The grid management server 42 sends, for example, a variety of notification for managing the power grid 20 to the power supply system 100. In the present embodiment, the information provision server 44 provides a variety of information. For example, the information provision server 44 provides weather information.

In the present embodiment, the power generation system 110 is configured to be capable of outputting the direct current power. The power generation system 110 is electrically connected to, for example, the power conditioner 120 and the power storage system 130. According to the present embodiment, the direct current power outputted by the power generation system 110 is inputted to the power conditioner 120, and is outputted to the power grid 20 via the power conditioner 120. In addition, out of the direct current power outputted by the power generation system 110, direct current power that could not be accepted by the power conditioner 120 is inputted to the power storage system 130, and is stored in the power storage system 130. Power stored in the power storage system 130 may be outputted to the power grid 20 via the power conditioner 120 at an appropriate timing.

The photovoltaic power generation panel 112 utilizes a photovoltaic effect, to convert optical energy into power. The photovoltaic power generation panel 112 includes, for example, a plurality of solar cell modules, and a frame and/or a stand for supporting the solar cell modules. The photovoltaic power generation panel 112 may include a solar cell array in which a plurality of solar cell strings are connected in parallel. Each of the plurality of solar cell strings may have a plurality of solar cell modules connected in series.

In the present embodiment, the connection unit 114 includes, for example, a terminal block for electrically connecting the plurality of solar cell modules included in the photovoltaic power generation panel 112 such that the photovoltaic power generation panel 112 outputs a specified current and voltage. The connection unit 114 is also referred to as a connection box. The connection unit 114 may have, in addition to a function of the terminal block, at least one function of a reverse flow prevention function, a surge absorber function, or a converter function.

For example, the connection unit 114 includes a converter (not shown in the figure), and a converter control unit (not shown in the figure) which controls the converter. The converter may be a DC/DC converter. The converter may be a boost converter.

The converter converts, for example, a voltage of the direct current power inputted to the connection unit 114. The converter may convert the voltage of the inputted direct current power in accordance with an instruction from the converter control unit. Specifically, the converter converts a direct current voltage inputted from the photovoltaic power generation panel 112 to the connection unit 114 into a direct current high voltage. As such, voltage-adjusted power is outputted from the connection unit 114 to the power collection board 116.

The converter control unit controls, for example, an operation of the converter. If the power generation system 110 includes the photovoltaic power generation panel 112, the converter may perform control such as Maximum Power Point Tracking (MPPT) control or automatic start/stop control, to adjust power generation efficiency of the photovoltaic power generation panel 112.

In the present embodiment, the power collection board 116, for example, combines the direct current power generated by a plurality of photovoltaic power generation panels 112 into one, to supply the combined power to the power conditioner 120. In the present embodiment, the power collection board 116 is electrically connected to the power conditioner 120 and the power storage system 130. As such, out of the power outputted from the power collection board 116, power that could not be accepted by the power conditioner 120 is inputted to the power storage system 130.

In the present embodiment, the power amount meter 118 measures, for example, a power amount of power outputted by the power generation system 110 (the power may be referred to as generated power, and the power amount may be referred to as a generated power amount). The power amount meter 118 may measure the generated power. The power amount meter 118 outputs, for example, information indicating a measurement result, to the control system 140. Examples of the measurement result include a present value of the generated power (kW), a present value of the generated power amount (kWh) based on a specific time point, and the like. The power amount meter 118 may output, to the control system 140, information in which information indicating one or more times is associated with the information indicating the measurement result at each time (the information in which these pieces of information are associated with each other may be referred to as a power generation history).

In the present embodiment, the power conditioner 120, for example, receives the direct current power outputted by at least one of the power generation system 110 or the power storage system 130, and converts the direct current power (which may be referred to as input power of the power conditioner 120) into the alternating current power. In addition, the power conditioner 120 supplies the alternating current power to the power grid 20.

The power conditioner 120 may control the output power (kW) of the power supply system 100. For example, the power conditioner 120 controls magnitude of the output power, and/or an extent of the fluctuation in the output power. Examples of the extent of the fluctuation in the output power include increase speed of the output power, decrease speed of the output power, the fluctuation rate of the output power, and the like.

The power conditioner 120 obtains, for example, from the control system 140, information required to control an operation of converting the direct current power into the alternating current power and/or an operation of supplying the alternating current power to the power grid 20. The power conditioner 120 will be described later in detail.

In the present embodiment, the power amount meter 122 measures a power amount of power outputted by the power conditioner 120 to the power grid 20 (that is, the power is the output power mentioned above, and the power amount may be referred to as an output power amount). The power amount meter 122 may measure the output power. The power amount meter 122 outputs, for example, information indicating a measurement result, to the control system 140. Examples of the measurement result include a present value of the output power (kW), a present value of the output power amount (kWh) based on a specific time point, and the like. The power amount meter 122 may output, to the control system 140, information in which information indicating one or more times is associated with the information indicating the measurement result at each time (the information in which these pieces of information are associated with each other may be referred to as an output history).

In the present embodiment, the power storage system 130 is configured to be capable of inputting and outputting the direct current power. The power storage system 130 is electrically connected to an output side of the power generation system 110 and the input side of the power conditioner 120.

As such, if the generated power of the power generation system 110 is greater than the output power of the power conditioner 120, out of the direct current power outputted from the power generation system 110, direct current power that could not be accepted by the power conditioner 120 is supplied to the power storage system 130. On the other hand, if the generated power of the power generation system 110 is smaller than the output power of the power conditioner 120, the direct current power is supplied from the power storage system 130 to the power conditioner 120.

According to the present embodiment, excess or deficiency of the generated power is adjusted while the power remains the direct current power. As such, the magnitude of the output power outputted from the power supply system 100 to the power grid 20 may be easily adjusted even if a complex arithmetic operation is not processed at high speed as in the prior art. As a result, the fluctuation in the output power is relatively easily suppressed.

The power storage system 130 includes, for example, a power storage battery (not shown in the figure) which stores power, and a charge/discharge control unit (not shown in the figure) which controls charge and discharge of the power storage battery. The power storage system 130 may include various sensors (not shown in the figure) for measuring a state of the power storage battery. Examples of the state of the power storage battery include a remaining capacity (Ah), an SOC (%), and the like. The power storage system 130 may output, to the control system 140, information indicating the state of the power storage battery.

The power amount meter 132 measures a power amount of power charged and discharged by the power storage system 130 (the power may be referred to as charged/discharged power, and the power amount may be referred to as a charged/discharged power amount). The power amount meter 132 may measure the charged/discharged power. The power amount meter 132 outputs, for example, information indicating a measurement result, to the control system 140. Examples of the measurement result include a present value of the charged/discharged power (kW), a present value of the charged/discharged power amount (kWh) based on a specific time point, and the like. The power amount meter 132 may output, to the control system 140, information in which information indicating one or more times is associated with the information indicating the measurement result at each time (the information in which these pieces of information are associated with each other may be referred to as a charge/discharge history).

The control system 140 controls the power supply system 100. The control system 140 obtains, for example, information indicating a state of each unit of the power supply system 100 from each unit of the power supply system 100. The control system 140 obtains, for example, information required to control the power supply system 100 from at least one of the grid management server 42 or the information provision server 44. The control system 140 controls an operation of the power supply system 100 based on this information.

In one embodiment, the control system 140 may control an operation of the power generation system 110 by sending information required to control the power generation system 110 to the power generation system 110. In another embodiment, the control system 140 may control an operation of the power conditioner 120 by sending information required to control the power conditioner 120 to the power generation system 110. In another embodiment, the control system 140 may control an operation of the power storage system 130 by sending information required to control the power storage system 130 to the power generation system 110.

(Specific Configuration of Each Unit of Power Supply System 100)

Each unit of the power supply system 100 may be realized by hardware, may be realized by software, or may be realized by hardware and software. At least part of each unit of the power supply system 100 may be realized by a single server, or may be realized by a plurality of servers. At least part of each unit of the power supply system 100 may be realized on a virtual machine or on a cloud system. At least part of each unit of the power supply system 100 may be realized by a personal computer or a mobile terminal. Examples of the mobile terminal may include a mobile phone, a smartphone, a PDA (registered trademark), a tablet, a notebook computer or a laptop computer, a wearable computer, and the like. Each unit of the power supply system 100 may utilize a distributed network or a distributed ledger technology such as a block chain, to store information.

If at least some of components constituting the power supply system 100 are realized by software, the components realized by the software may be realized by starting software or a program that specifies an operation regarding the components in an information processing apparatus having a general configuration. The information processing apparatus having a general configuration may include (i) a data processing apparatus having a processor such as a CPU or a GPU, a ROM, a RAM, a communication interface, and the like, (ii) an input apparatus such as a keyboard, a pointing device, a touch panel, a camera, an audio input apparatus, a gesture input apparatus, various sensors, or a GPS receiver, (iii) an output apparatus such as a display apparatus, an audio output apparatus, or a vibration apparatus, and (iv) a storage apparatus (including an external storage apparatus) such as a memory, an HDD, or an SSD.

In the information processing apparatus having a general configuration, the data processing apparatus or the storage apparatus may store the software or the program. The software or the program, when executed by a processor, causes the information processing apparatus to execute the operation specified by the software or the program. The software or the program may be stored in a non-transitory computer-readable recording medium.

The software or the program may be a program that causes a computer to function as the power supply system 100 or part thereof. The software or the program may be a program that causes a computer to execute information processing in the power supply system 100 or part thereof.

Examples of the information processing include a control method for controlling output power, which is power outputted by a power supply apparatus to a power grid. The control method has, for example, controlling an output by causing the power supply apparatus to operate in any one mode of (i) a first mode in which magnitude of the output power is increased such that an absolute value of a fluctuation rate indicating a ratio of a fluctuation amount of the output power per unit time to a rated output of the power supply apparatus is equal to or smaller than a first threshold value or smaller than the first threshold value, (ii) a second mode in which the magnitude of the output power is decreased such that the absolute value of the fluctuation rate is equal to or smaller than a second threshold value or smaller than the second threshold value, and (iii) a third mode in which the magnitude of the output power is maintained such that the absolute value of the fluctuation rate is equal to or smaller than a third threshold value or smaller than the third threshold value.

In the control method, the third threshold value may be smaller than the first threshold value and the second threshold value. The third threshold value may be 0 or substantially 0. For example, if the third threshold value is sufficiently small compared to the first threshold value or the second threshold value, the third threshold value may be considered to be substantially 0. In the control method, the first threshold value may be the same as or different from the second threshold value. The first threshold value may be substantially the same as the second threshold value. For example, if a difference between the first threshold value and the second threshold value is smaller than a predetermined value, the first threshold value may be considered to be substantially the same as the second threshold value. The predetermined value may be equal to or smaller than 0.1%/minute, or may be smaller than 0.1%/minute.

In the control method, the first threshold value may be equal to or smaller than 5%/minute, may be equal to or smaller than 4%/minute, may be equal to or smaller than 1%/minute, or may be equal to or smaller than 0.8%/minute. The second threshold value may be equal to or smaller than 5%/minute, may be equal to or smaller than 4%/minute, may be equal to or smaller than 1%/minute, or may be equal to or smaller than 0.8%/minute. The third threshold value may be equal to or smaller than 0.2%/minute, may be equal to or smaller than 0.1%/minute, or may be smaller than 0.1%/minute.

In the first mode, an output control unit may control the output power such that the output power increases at a first fluctuation rate. The first fluctuation rate may be a substantially fixed value. In the second mode, the output control unit may control the output power such that the output power decreases at a second fluctuation rate. The second fluctuation rate may be a substantially fixed value. In the third mode, the output control unit may control the output power such that the output power does not substantially fluctuate.

An absolute value of the first fluctuation rate may be substantially the same as an absolute value of the second fluctuation rate. For example, if a difference between the absolute value of the first fluctuation rate and the absolute value of the second fluctuation rate is smaller than a predetermined value, the absolute value of the first fluctuation rate may be considered to be substantially the same as the absolute value of the second fluctuation rate. The predetermined value may be equal to or smaller than 0.1%/minute, or may be smaller than 0.1%/minute.

The power supply system 100 may be one example of the power supply apparatus. A maximum output that can be outputted by the power supply system 100 may be one example of a maximum value of ability of the power supply apparatus to supply power to the power grid. The power generation system 110 may be one example of a power generation apparatus. The photovoltaic power generation panel 112 may be one example of a photovoltaic power generation apparatus. The power amount meter 118 may be one example of a generated power value obtainment unit. The power conditioner 120 may be one example of a control apparatus, a power conversion apparatus, or a power conversion system. The power amount meter 122 may be one example of an output power value obtainment unit. The power storage system 130 may be one example of a power storage apparatus. A sensor arranged in the power storage system 130 may be one example of a power storage state obtainment unit. The power amount meter 132 may be one example of the power storage state obtainment unit. The control system 140 may be one example of the generated power value obtainment unit, the output power value obtainment unit, or the power storage state obtainment unit.

One Example of Another Embodiment

In the present embodiment, one example of the power supply system 100 has been described by taking, as an example, a case where the power amount meter 118, the power amount meter 122, and the power amount meter 132 output, to the control system 140, the information indicating the measurement result. However, the power supply system 100 is not limited to the present embodiment. In another embodiment, the power amount meter 118, the power amount meter 122, and the power amount meter 132 may output, to the power conditioner 120, the information indicating the measurement result.

In the present embodiment, one example of the power supply system 100 has been described by taking, as an example, a case where a computer or a control circuit arranged inside the power conditioner 120 controls various operations of the power conditioner 120. However, the power supply system 100 is not limited to the present embodiment. In another embodiment, the control system 140 may control various operations of the power conditioner 120. In this case, the control system 140 may be one example of the output control unit or the control apparatus.

In the present embodiment, one example of the power supply system 100 has been described by taking, as an example, a case where the connection unit 114 includes a converter and the connection unit 114 adjusts a voltage of the direct current power outputted by the photovoltaic power generation panel 112 or executes the Maximum Power Point Tracking (MPPT) control. However, the power supply system 100 is not limited to the present embodiment. In another embodiment, the power conditioner 120 may include a converter, and the power conditioner 120 may adjust a voltage of the direct current power outputted by the power collection board 116 or execute the Maximum Power Point Tracking (MPPT) control.

Figure 2:
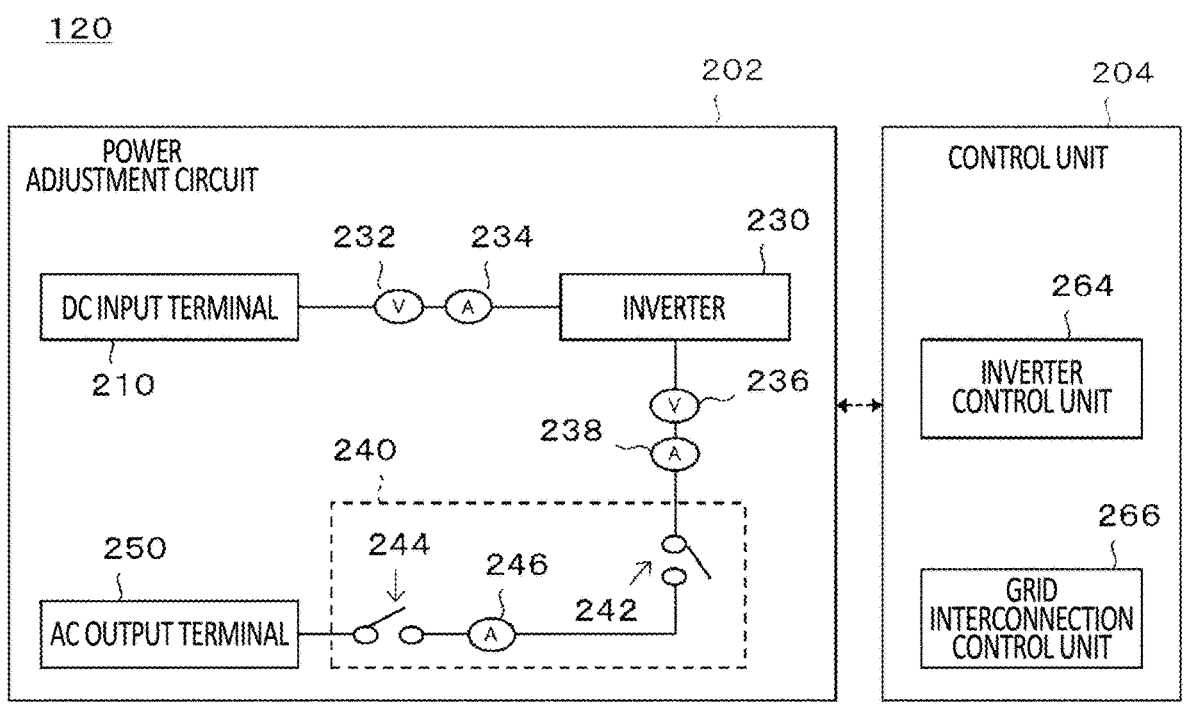
FIG. 2 schematically shows one example of an internal configuration of a power conditioner 120.

FIG. 2 schematically shows one example of an internal configuration of a power conditioner 120. In the present embodiment, the power conditioner 120 include, for example, a power adjustment circuit 202 which adjusts inputted power and outputs the adjusted power, and a control unit 204 which controls the power adjustment circuit 202.

In the present embodiment, the power adjustment circuit 202 includes, for example, a DC input terminal 210, an inverter 230, a grid interconnection unit 240, and an AC output terminal 250. The power adjustment circuit 202 may include a voltmeter 232, an ammeter 234, a voltmeter 236, and an ammeter 238. In the present embodiment, the grid interconnection unit 240 has, for example, an interconnection side switch 242, an interconnection side breaker 244, and an ammeter 246. In the present embodiment, the control unit 204 includes, for example, an inverter control unit 264 and a grid interconnection control unit 266.

In the present embodiment, the DC input terminal 210 is electrically connected to, for example, a power generation system 110 and a power storage system 130. The DC input terminal 210 receives power outputted by at least one of the power generation system 110 or the power storage system 130. The DC input terminal 210 outputs direct current power inputted to the DC input terminal 210 to the inverter 230.

In the present embodiment, the inverter 230 converts, for example, the inputted direct current power into alternating current power. The inverter 230 may convert the inputted direct current power into the alternating current power in accordance with an instruction from the inverter control unit 264. The inverter 230 outputs the converted alternating current power to the grid interconnection unit 240.

In the present embodiment, the voltmeter 232 measures an input voltage of the inverter 230. The voltmeter 232 may output, to the control unit 204, information indicating a measurement result. In the present embodiment, the ammeter 234 measures an input current of the inverter 230. The ammeter 234 may output, to the control unit 204, information indicating a measurement result. In the present embodiment, the voltmeter 236 measures an output voltage of the inverter 230. The voltmeter 236 may output, to the control unit 204, information indicating a measurement result. In the present embodiment, the ammeter 238 measures an output current of the inverter 230. The ammeter 238 may output, to the control unit 204, information indicating a measurement result.

In the present embodiment, the grid interconnection unit 240 performs various operations related to interconnection between a power supply system 100 and a power grid 20. Each unit of the grid interconnection unit 240 may work in accordance with an instruction from the grid interconnection control unit 266.

In the present embodiment, the interconnection side switch 242 electrically connects or electrically disconnects the power conditioner 120 to or from the power grid 20. In the present embodiment, the interconnection side breaker 244 protects the power grid 20 and the power conditioner 120 from a short circuit and a ground fault. In the present embodiment, the ammeter 246 measures a current value of output power outputted from the AC output terminal 250. The ammeter 246 may output, to the control unit 204, information indicating a measurement result.

In the present embodiment, the AC output terminal 250 is electrically connected to, for example, the power grid 20 and a power distribution board 30. The AC output terminal 250 outputs, to the power grid 20 and/or the power distribution board 30, the alternating current power outputted by the inverter 230.

In the present embodiment, the inverter control unit 264 controls an operation of the inverter 230. This allows the inverter control unit 264 to control the output power of the power supply system 100. For example, the inverter control unit 264 controls the inverter 230, to adjust magnitude of the output power outputted by the power supply system 100 to the power grid 20. The inverter control unit 264 may adjust the magnitude of the output power such that a short-term fluctuation in the output power is suppressed. The inverter control unit 264 may obtain the information indicating the measurement result of at least one of the voltmeter 232, the ammeter 234, the voltmeter 236, or the ammeter 238. The inverter control unit 264 will be described later in detail.

In the present embodiment, the grid interconnection control unit 266 controls an operation of the grid interconnection unit 240. For example, the grid interconnection control unit 266 controls switching of the interconnection side switch 242. The grid interconnection control unit 266 may control switching of the interconnection side breaker 244. The grid interconnection control unit 266 may obtain the information indicating the measurement result of the ammeter 246.

The power adjustment circuit 202 may be one example of a power conversion apparatus. The inverter 230 may be one example of the power conversion apparatus. The inverter control unit 264 may be one example of an output control unit or a control apparatus.

Figure 3:
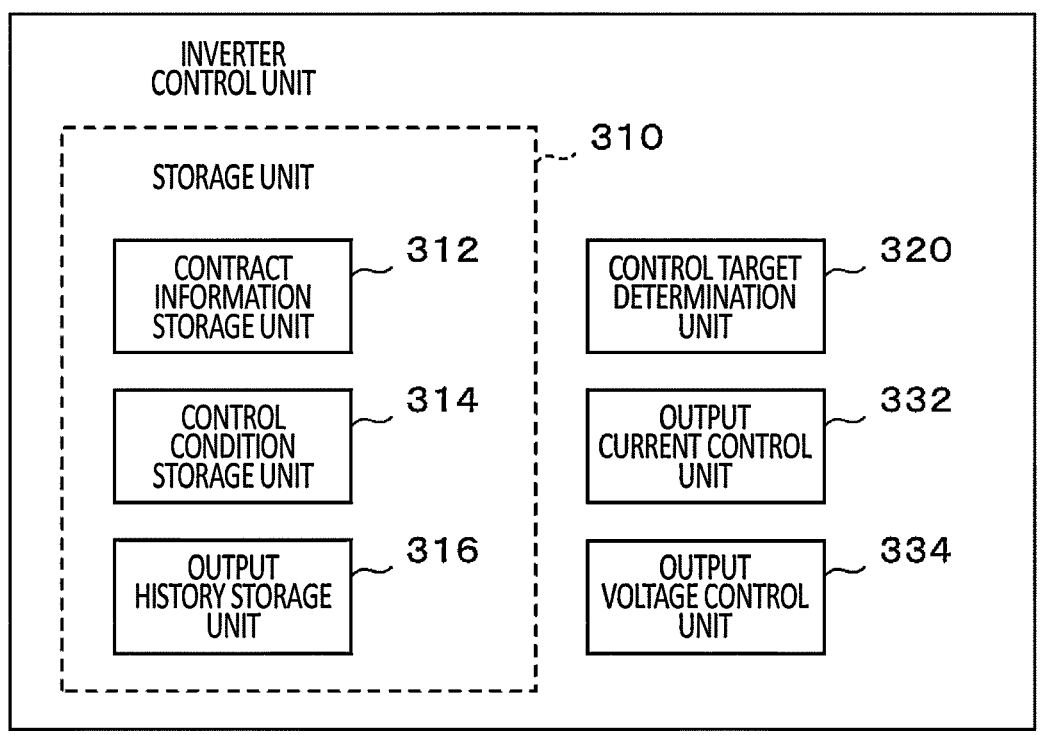
FIG. 3 schematically shows one example of an internal configuration of an inverter control unit 264.

FIG. 3 schematically shows one example of an internal configuration of an inverter control unit 264. In the present embodiment, the inverter control unit 264 includes, for example, a storage unit 310, a control target determination unit 320, an output current control unit 332, and an output voltage control unit 334. In the present embodiment, the storage unit 310 has, for example, a contract information storage unit 312, a control condition storage unit 314, and an output history storage unit 316.

In the present embodiment, the storage unit 310 stores a variety of information. In the present embodiment, the contract information storage unit 312 stores a variety of information regarding the power sale contract mentioned above. Examples of the information regarding the power sale contract include information indicating a maximum power (kW) received by a power grid stipulated in the power sale contract, information regarding a rule stipulated by an operator of a power grid 20 who is one of parties to the power sale contract, a variety of information notified from a grid management server 42 to a power supply system 100 based on the power sale contract, and the like. The rule may include a rule regarding an acceptable range of a fluctuation rate of power supplied from the power supply system 100 to the power grid 20.

In the present embodiment, the control condition storage unit 314 stores a variety of information regarding control over output power of the power supply system 100. Examples of the information regarding the control over the output power include information indicating a maximum value of magnitude of the output power, information indicating a condition regarding a fluctuation in the output power, and the like. Examples of the condition regarding the fluctuation in the output power include an upper limit or a range of an absolute value of a fluctuation rate, an upper limit or a range of fluctuation speed of the output power, and the like. The condition regarding the fluctuation in the output power is determined, for example, such that the power sale contract, and/or the rule stipulated by the operator of the power grid 20 are followed. In the present embodiment, the output history storage unit 316 stores an output history of the power supply system 100.

In the present embodiment, the control target determination unit 320 determines a target value for a power conditioner 120 to control the output power of the power supply system 100. The control target determination unit 320 may determine a target value of the magnitude of the output power at each of one or more times. The control target determination unit 320 may determine a target value of magnitude of an output voltage at each of one or more times. The control target determination unit 320 may determine a target value of magnitude of an output current at each of one or more times.

For example, the control target determination unit 320 first determines an operation mode of the power conditioner 120. Next, the control target determination unit 320 determines the magnitude of the output current. The control target determination unit 320 may determine the magnitude of the output voltage and the output current. This allows the control target determination unit 320 to control the output power of the power supply system 100. The control target determination unit 320 will be described later in detail.

Examples of the operation mode of the power conditioner 120 include (i) an increase mode in which the magnitude of the output power is increased, (ii) a decrease mode in which the magnitude of the output power is decreased, and (iii) a hold mode in which the magnitude of the output power is maintained. In each operation mode, the power conditioner 120 may control the magnitude of the output power so as to suppress the fluctuation in the output power. For example, the power conditioner 120 controls the magnitude of the output power such that an absolute value of a fluctuation rate of the output power is equal to or smaller than a predetermined value or smaller than the value.

According to the present embodiment, regardless of the operation mode of the power conditioner 120, if generated power of a power generation system 110 is greater than a control target (which is, for example, a specific value or numerical range) of the output power of the power conditioner 120, a power storage system 130 may be charged. Similarly, if the generated power of the power generation system 110 is smaller than the control target (which is, for example, the specific value or numerical range) of the output power of the power conditioner 120, the power storage system 130 may be discharged.

In the present embodiment, the increase mode may be an operation mode in which the magnitude of the output power is increased such that the absolute value of the fluctuation rate of the output power is equal to or smaller than a first threshold value or smaller than the first threshold value. In one embodiment of the increase mode, the magnitude of the output power is controlled such that the fluctuation value of the output power is a predetermined target value. An absolute value of the target value is equal to or smaller than the first threshold value or smaller than the first threshold value. In another embodiment of the increase mode, the magnitude of the output power is controlled such that the fluctuation value of the output power changes in a predetermined numerical range. An absolute value of an upper limit value of the numerical range may be equal to or smaller than the first threshold value or smaller than the first threshold value. A lower limit value of the numerical range may be equal to or greater than 0.

In the present embodiment, the decrease mode may be an operation mode in which the magnitude of the output power is decreased such that the absolute value of the fluctuation rate of the output power is equal to or smaller than a second threshold value or smaller than the second threshold value. In one embodiment of the decrease mode, the magnitude of the output power is controlled such that the fluctuation value of the output power is a predetermined target value. An absolute value of the target value is equal to or smaller than the second threshold value or smaller than the second threshold value. In another embodiment of the decrease mode, the magnitude of the output power is controlled such that the fluctuation value of the output power changes in a predetermined numerical range. An absolute value of a lower limit value of the numerical range may be equal to or smaller than the second threshold value or smaller than the second threshold value. An upper limit value of the numerical range may be equal to or smaller than 0.

In the present embodiment, the hold mode may be an operation mode in which the magnitude of the output power is maintained such that the absolute value of the fluctuation rate of the output power is equal to or smaller than a third threshold value or smaller than the third threshold value. In one embodiment of the hold mode, the magnitude of the output power is controlled such that the fluctuation value of the output power is a predetermined target value. An absolute value of the target value is equal to or smaller than the third threshold value or smaller than the third threshold value. In another embodiment of the hold mode, the magnitude of the output power is controlled such that the fluctuation value of the output power changes in a predetermined numerical range. An absolute value of an upper limit value of the numerical range may be equal to or smaller than the third threshold value or smaller than the third threshold value. An absolute value of a lower limit value of the numerical range may be equal to or smaller than the third threshold value or smaller than the third threshold value. In the hold mode, the magnitude of the output power may be substantially maintained.

The first threshold value may be the same as or different from the second threshold value. The first threshold value may be substantially the same as the second threshold value. For example, if a difference between the first threshold value and the second threshold value is smaller than a predetermined value, the first threshold value may be considered to be substantially the same as the second threshold value. The predetermined value may be equal to or smaller than 0.1%/minute, or may be smaller than 0.1%/minute.

The first threshold value may be equal to or smaller than 5%/minute, may be equal to or smaller than 4%/minute, may be equal to or smaller than 1%/minute, or may be equal to or smaller than 0.8%/minute. The second threshold value may be equal to or smaller than 5%/minute, may be equal to or smaller than 4%/minute, may be equal to or smaller than 1%/minute, or may be equal to or smaller than 0.8%/minute. The third threshold value of the fluctuation rate may be equal to or smaller than 5%/minute, may be equal to or smaller than 1%/minute, or may be equal to or smaller than 0.8%/minute.

The third threshold value may be smaller than the first threshold value and the second threshold value. The third threshold value may be 0 or substantially 0. For example, if the third threshold value is sufficiently small compared to the first threshold value or the second threshold value, the third threshold value may be considered to be substantially 0.

In the present embodiment, the output current control unit 332 controls an operation of an inverter 230, for example, such that a value of the output current of the inverter 230 is the target value determined by the control target determination unit 320. In the present embodiment, the output voltage control unit 334 controls an operation of an inverter 230, for example, such that a value of the output voltage of the inverter 230 is the target value determined by the control target determination unit 320.

The control target determination unit 320 may be one example of an output control unit or a control apparatus. The increase mode may be one example of a first mode. The decrease mode may be one example of a second mode. The hold mode may be one example of a third mode.

Figure 4:
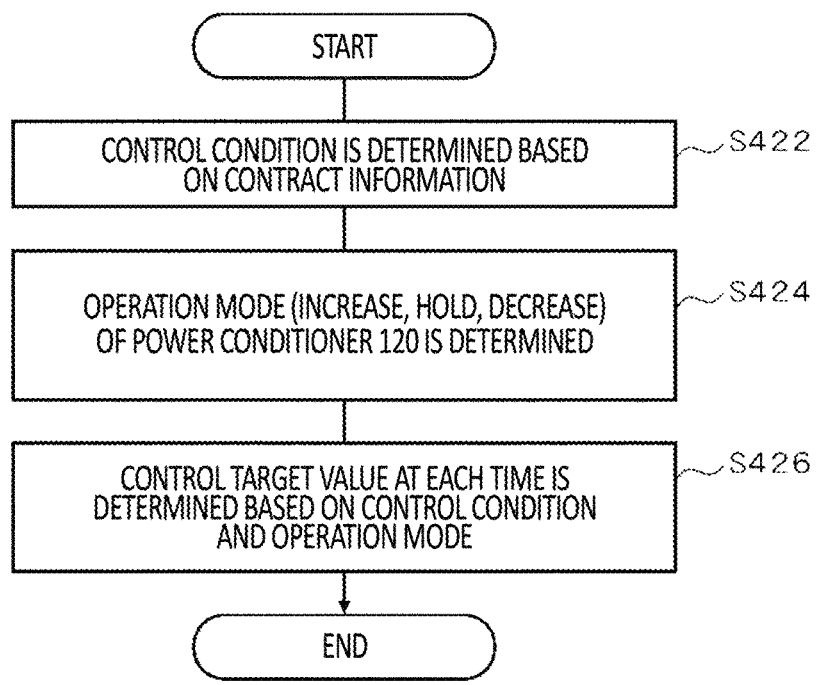
FIG. 4 schematically shows one example of information processing in a control target determination unit 320.

FIG. 4 schematically shows one example of information processing in a control target determination unit 320. According to the present embodiment, for example, first, in Step 422 (Step may be abbreviated as S), the control target determination unit 320 determines a condition regarding control over output power (which may be referred to as a control condition) based on information regarding a sale and purchase contract stored in a contract information storage unit 312.

For example, if the sale and purchase contract stipulates that a ratio of a fluctuation amount per minute of the output power of the power supply system 100 to a rated output of the power supply system 100 (that is, a fluctuation rate) is equal to or smaller than 1%/minute, as the control condition for an increase mode, it determines to increase magnitude of the output power such that an absolute value of the fluctuation rate of the output power is equal to or smaller than 0.8%/minute or smaller than 0.8%/minute. Similarly, as the control condition for a decrease mode, it determines to decrease the magnitude of the output power such that the absolute value of the fluctuation rate of the output power is equal to or smaller than 0.8%/minute or smaller than 0.8%/minute.

Next, in S424, the control target determination unit 320 determines an operation mode of a power conditioner 120. For example, the control target determination unit 320 determines the operation mode of the power conditioner 120 based on (i) a difference between a predetermined value as a comparison target at each time and a present value of the output power, and/or (ii) a present value of an SOC of a power storage battery. The comparison target will be described later in detail.

Next, in S426, the control target determination unit 320 determines target values of an output voltage and/or an output current at each time based on the operation mode of the power conditioner 120 and on the control condition for each operation mode. The control target determination unit 320 determines a control amount of a power adjustment circuit 202, and outputs a control signal to the power adjustment circuit 202. For example, the control target determination unit 320 determines a control amount of an inverter 230, and outputs a control signal to the inverter 230. This suppresses a fluctuation in the output power of the power supply system 100.

Figure 5:
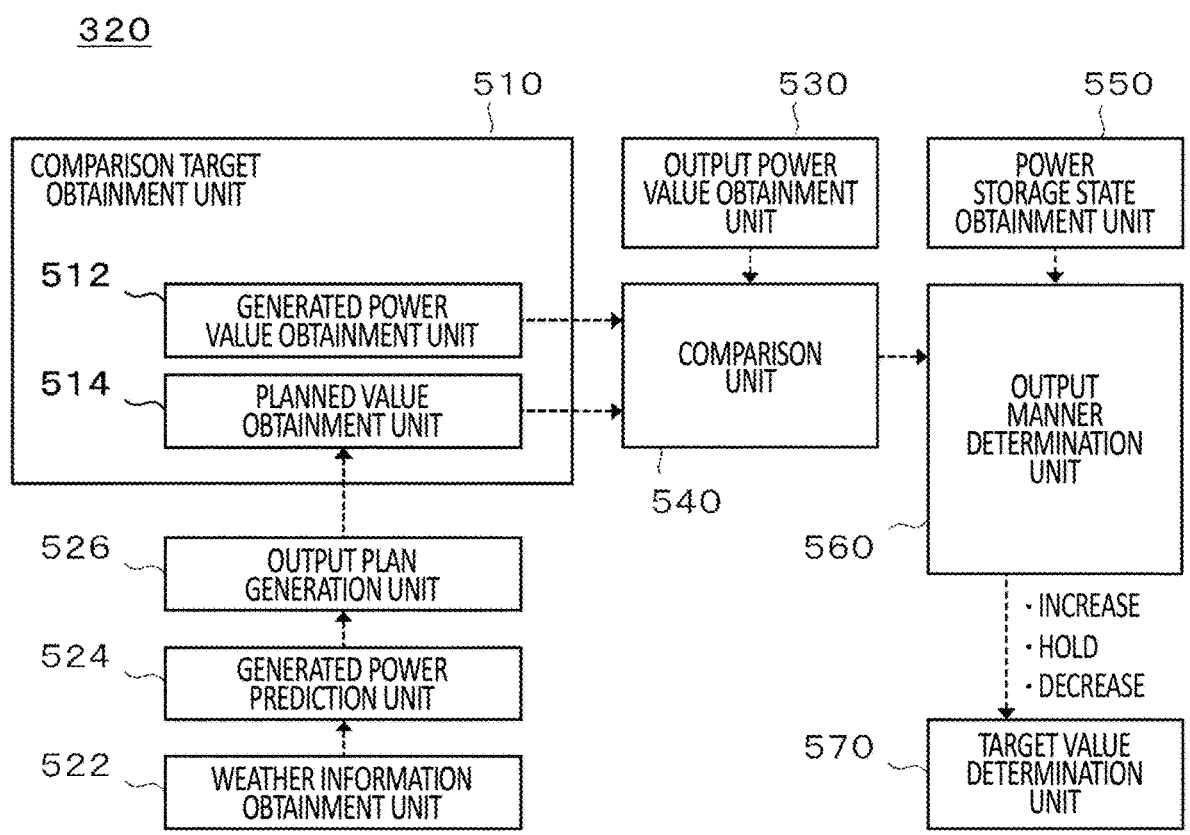
FIG. 5 schematically shows one example of an internal configuration of a control target determination unit 320.

FIG. 5 schematically shows one example of an internal configuration of a control target determination unit 320. In the present embodiment, the control target determination unit 320 includes, for example, a comparison target obtainment unit 510, a weather information obtainment unit 522, a generated power prediction unit 524, an output plan generation unit 526, an output power value obtainment unit 530, a comparison unit 540, a power storage state obtainment unit 550, an output manner determination unit 560, and a target value determination unit 570. In the present embodiment, the comparison target obtainment unit 510 has, for example, a generated power value obtainment unit 512 and a planned value obtainment unit 514.

In the present embodiment, the comparison target obtainment unit 510 obtains the value as the comparison target mentioned above. Examples of the comparison target include a present value of generated power of a power generation system 110, and a value indicated by a plan regarding magnitude of output power at each of one or more times (the plan may be referred to as an output plan, and the value indicated by the plan may be referred to as a planned value).

In the present embodiment, the generated power value obtainment unit 512 obtains information indicating the present value of the generated power (kW) of the power generation system 110. For example, the generated power value obtainment unit 512 obtains the information indicating the present value of the generated power (kW) of the power generation system 110 from a power amount meter 118 or a control system 140.

The planned value obtainment unit 514 obtains information indicating the planned value of the output power (kW) of a power supply system 100 at a specific time. The planned value obtainment unit 514 obtains the information indicating the planned value of the output power of the power supply system 100 at a present time point or at a time point where the control target determination unit 320 is expected to output a control signal, for example.

The planned value obtainment unit 514 may obtain the information indicating the planned value at the specific time by obtaining the output plan of the power supply system 100. The output plan may be information in which information indicating each of the one or more times is associated with information indicating the output power of the power supply system 100 at each time. The planned value obtainment unit 514 may obtain the output plan generated by the output plan generation unit 526.

In the present embodiment, the weather information obtainment unit 522 obtains weather information for an area where the power generation system 110 is installed. The weather information obtainment unit 522 obtains, for example, from an information provision server 44, the weather information for the area where the power generation system 110 is installed.

In the present embodiment, the generated power prediction unit 524 derives, based on the weather information obtained by the weather information obtainment unit 522, a prediction value of the generated power at each of a plurality of times included in at least a first time period. The first time period may be any time period. An interval between the plurality of times may be any value. For example, the generated power prediction unit 524 predicts the generated power from 8:00 a.m. to 7:59 p.m. on November 17 every minute.

In the present embodiment, the output plan generation unit 526 determines, based on the prediction value of the generated power derived by the generated power prediction unit 524, the planned value of the output power of the power supply system 100 at each of a plurality of times included in a second time period. For example, the output plan generation unit 526 predicts the generated power from 12:00 a.m. to 11:59 p.m. on November 17 every minute based on the generated power from 8:00 a.m. to 7:59 p.m. on November 17 derived by the generated power prediction unit 524.

The first time period may be the same or substantially the same as or different from the second time period. If the first time period is different from the second time period, a length of the second time period may be greater than a length of the first time period, or may be smaller than the length of the first time period. If the first time period is different from the second time period, a commencement time of the second time period may be a time earlier than a commencement time of the first time period. In addition, a termination time of the second time period may be a time later than the commencement time of the first time period, may be a time earlier than a termination time of the first time period, or may be a time later than the termination time of the first time period.

In the present embodiment, the output power value obtainment unit 530 obtains information indicating a present value of the output power of the power supply system 100. For example, the output power value obtainment unit 530 obtains the information indicating the present value of the output power of the power supply system 100 from the control system 140.

In the present embodiment, the comparison unit 540 compares the value as the comparison target obtained by the comparison target obtainment unit 510 with the present value of the output power obtained by the output power value obtainment unit 530. The comparison unit 540 outputs, to the output manner determination unit 560, information indicating a comparison result (which is, for example, a magnitude relationship). In one embodiment, the comparison unit 540 compares, for example, the present value of the generated power obtained by the generated power value obtainment unit 512 with the present value of the output power obtained by the output power value obtainment unit 530. In another embodiment, the comparison unit 540 compares, for example, the planned value of the output power at the present time point obtained by the planned value obtainment unit 514 with the present value of the output power obtained by the output power value obtainment unit 530.

In the present embodiment, the power storage state obtainment unit 550 obtains information indicating a remaining capacity or an SOC of a power storage system 130. For example, the power storage state obtainment unit 550 obtains the information indicating the remaining capacity or the SOC of the power storage system 130 from the power storage system 130 or the control system 140.

In the present embodiment, the output manner determination unit 560 determines an operation mode of a power conditioner 120. For example, the output manner determination unit 560 determines the operation mode of the power conditioner 120 based on the present value of the generated power and the present value of the output power. For example, the output manner determination unit 560 determines the operation mode of the power conditioner 120 based on the planned value of the output power and the present value of the output power. For example, the output manner determination unit 560 determines the operation mode of the power conditioner 120 based on the remaining capacity or the SOC of the power storage system 130. The output manner determination unit 560 may determine the operation mode of the power conditioner 120 based on a combination of the above.

First Embodiment

In the present embodiment, the output manner determination unit 560 determines the operation mode of the power conditioner 120 based on the present value of the generated power and the present value of the output power. The operation mode of the power conditioner 120 may be an operation mode of an inverter 230.

For example, the output manner determination unit 560: (a) determines to cause the power conditioner 120 to operate in an increase mode if the present value of the generated power is greater than the present value of the output power; and/or (b) determines to cause the power conditioner 120 to operate in a decrease mode if the present value of the generated power is smaller than the present value of the output power. The output manner determination unit 560 may determine to cause the power conditioner 120 to operate in a hold mode if a difference between the present value of the generated power and the present value of the output power is smaller than a fourth threshold value. The fourth threshold value may be determined such that the present value of the generated power is substantially the same as the present value of the output power.

The output manner determination unit 560 may determine to cause the power conditioner 120 to operate in the hold mode if a ratio of the present value of the output power to the present value of the generated power falls within a predetermined numerical range. The numerical range may be determined such that the present value of the generated power is substantially the same as the present value of the output power. The numerical range may have only an upper limit set, or may have the upper limit and a lower limit set. For example, if the difference between the present value of the generated power and the present value of the output power is within 0.5% of the present value of the output power, the present value of the generated power may be considered to be substantially the same as the present value of the output power.

The output manner determination unit 560 may determine to cause the power conditioner 120 to operate in the hold mode if an output of the power conditioner 120 or the inverter 230 reaches a predetermined upper limit value. The output manner determination unit 560 may determine to cause the power conditioner 120 to operate in the hold mode if the output of the power conditioner 120 or the inverter 230 reaches a maximum output.

Second Embodiment

In the present embodiment, the output manner determination unit 560 determines the operation mode of the power conditioner 120 based on the planned value of the output power and the present value of the output power. The operation mode of the power conditioner 120 may be the operation mode of the inverter 230.

For example, the output manner determination unit 560: (a) determines to cause the power conditioner 120 to operate in an increase mode if the planned value of the output power is greater than the present value of the output power; and/or (b) determines to cause the power conditioner 120 to operate in a decrease mode if the planned value of the output power is smaller than the present value of the output power. The output manner determination unit 560 may determine to cause the power conditioner 120 to operate in the hold mode if a difference between the planned value of the output power and the present value of the output power is smaller than the fourth threshold value. The fourth threshold value may be determined such that the planned value of the output power is substantially the same as the present value of the output power.

The output manner determination unit 560 may determine to cause the power conditioner 120 to operate in the hold mode if a ratio of the present value of the output power to the planned value of the output power falls within a predetermined numerical range. The numerical range may be determined such that the planned value of the output power is substantially the same as the present value of the output power. The numerical range may have only an upper limit set, or may have the upper limit and a lower limit set. The numerical range may have only an upper limit set, or may have the upper limit and a lower limit set. For example, if the difference between the planned value of the output power and the present value of the output power is within 0.5% of the present value of the output power, the present value of the generated power may be considered to be substantially the same as the present value of the output power.

The output manner determination unit 560 may determine to cause the power conditioner 120 to operate in the hold mode if the output of the power conditioner 120 or the inverter 230 reaches a predetermined upper limit value. The output manner determination unit 560 may determine to cause the power conditioner 120 to operate in the hold mode if the output of the power conditioner 120 or the inverter 230 reaches a maximum output.

Third Embodiment

In the present embodiment, the output manner determination unit 560 determines the operation mode of the power conditioner 120 based on the remaining capacity or the SOC of the power storage system 130. The operation mode of the power conditioner 120 may be the operation mode of the inverter 230.

In one embodiment, if the present value of the generated power is greater than the present value of the output power, the output manner determination unit 560, for example, (i) determines to cause the power conditioner 120 to operate in the increase mode when the remaining capacity or the SOC of the power storage system 130 is greater than a fifth threshold value, and (ii) determines to cause the power conditioner 120 to operate in the hold mode when a remaining capacity or an SOC of a power storage apparatus is smaller than the fifth threshold value. The fifth threshold value may be 30%, may be 20%, or may be 10%.

As such, the remaining capacity or the SOC of the power storage system 130 is appropriately maintained. According to the present embodiment, since the power storage system 130 has a sufficient amount of dischargeable power, even if the generated power of the power generation system 110 suddenly decreases, a fluctuation in the output power of the power supply system 100 may be suppressed.

If the present value of the generated power is smaller than the present value of the output power, the output manner determination unit 560, for example, (i) determines to cause the power conditioner 120 to operate in the decrease mode when the remaining capacity or the SOC of the power storage apparatus is smaller than a sixth threshold value, and (ii) determines to cause the power conditioner 120 to operate in the hold mode when the remaining capacity or the SOC of the power storage apparatus is greater than the sixth threshold value. The sixth threshold value may be 40%, may be 50%, or may be 60%. It should be noted that the fifth threshold value may be smaller than the sixth threshold value.

As such, the remaining capacity or the SOC of the power storage system 130 is appropriately maintained. According to the present embodiment, since the power storage system 130 is operated in a chargeable state, even if the generated power of the power generation system 110 suddenly increases, the fluctuation in the output power of the power supply system 100 may be suppressed.

In another embodiment, if the planned value of the output power is greater than the present value of the output power, the output manner determination unit 560, for example, (i) determines to cause the power conditioner 120 to operate in the increase mode when the remaining capacity or the SOC of the power storage apparatus is greater than the fifth threshold value, and (ii) determines to cause the power conditioner 120 to operate in the hold mode when the remaining capacity or the SOC of the power storage apparatus is smaller than the fifth threshold value. The fifth threshold value may be 30%, may be 20%, or may be 10%.

As such, the remaining capacity or the SOC of the power storage system 130 is appropriately maintained. According to the present embodiment, since the power storage system 130 has a sufficient amount of dischargeable power, even if the generated power of the power generation system 110 suddenly decreases, the fluctuation in the output power of the power supply system 100 may be suppressed.

If the planned value of the output power is smaller than the present value of the output power, the output manner determination unit 560, for example, (i) determines to cause the power conditioner 120 to operate in the decrease mode when the remaining capacity or the SOC of the power storage system 130 is smaller than the sixth threshold value, and (ii) determines to cause the power conditioner 120 to operate in the hold mode when the remaining capacity or the SOC of the power storage system 130 is greater than the sixth threshold value. The sixth threshold value may be 40%, may be 50%, or may be 60%. It should be noted that the fifth threshold value may be smaller than the sixth threshold value.

As such, the remaining capacity or the SOC of the power storage system 130 is appropriately maintained. According to the present embodiment, since the power storage system 130 is operated in a chargeable state, even if the generated power of the power generation system 110 suddenly increases, the fluctuation in the output power of the power supply system 100 may be suppressed.

The target value determination unit 570 determines target values of an output voltage and/or an output current at each time based on the operation mode of the power conditioner 120 and on a control condition for each operation mode. The control condition for each operation mode may be a condition regarding a fluctuation rate of the output power.

One Example of Another Embodiment

In the present embodiment, one example of the power supply system 100 has been describe by taking, as an example, a case where the control target determination unit 320 includes the generated power value obtainment unit 512, the planned value obtainment unit 514, the output power value obtainment unit 530, the comparison unit 540, and the power storage state obtainment unit 550. However, the power supply system 100 is not limited to the present embodiment.

In another embodiment, the comparison target obtainment unit 510 may not include at least one of the generated power value obtainment unit 512 or the output power value obtainment unit 530. In yet another embodiment, the comparison target obtainment unit 510 may not include the power storage state obtainment unit 550. In yet another embodiment, the comparison target obtainment unit 510 may not include at least one of the planned value obtainment unit 514, the weather information obtainment unit 522, the generated power prediction unit 524, the output plan generation unit 526, or the output power value obtainment unit 530.

Figure 6:
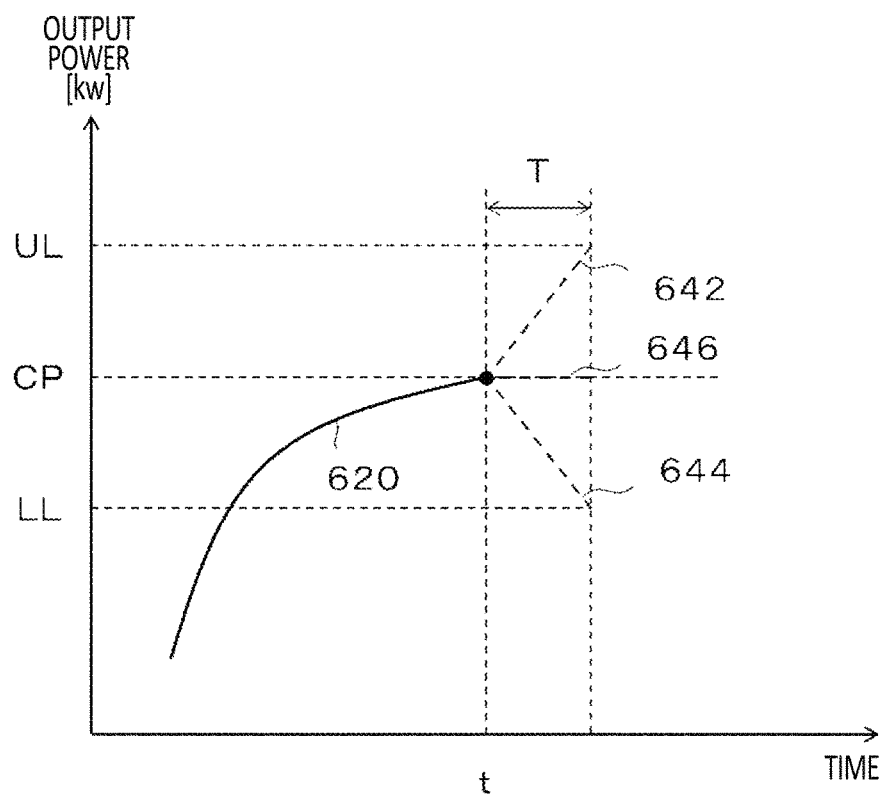
FIG. 6 schematically shows one example of an output manner of a power supply system 100.

FIG. 6 schematically shows one example of an output manner of a power supply system 100. FIG. 6 shows an output history 620 of the power supply system 100, and a future transition of output power for a case where a power conditioner 120 operates in each operation mode.

A dotted line 642 indicates a transition of the output power for a case where a control target determination unit 320 determines to cause the power conditioner 120 to operate in an increase mode at a time t. In this case, the output power increases at a predetermined fluctuation rate. As a result, magnitude of the output power after a unit time T has elapsed from the time t is UL.

A dotted line 644 indicates a transition of the output power for a case where the control target determination unit 320 determines to cause the power conditioner 120 to operate in a decrease mode at the time t. In this case, the output power decreases at a predetermined fluctuation rate. As a result, the magnitude of the output power after the unit time T has elapsed from the time t is LL.

A dotted line 646 indicates a transition of the output power for a case where the control target determination unit 320 determines to cause the power conditioner 120 to operate in a hold mode at the time t. In this case, the magnitude of the output power at the time t is maintained. As a result, the magnitude of the output power after the unit time T has elapsed from the time t is CP.

With reference to FIG. 7, FIG. 8, FIG. 9, and FIG. 10, one example of a relationship between generated power and output power will be described. Each of FIG. 7 to FIG. 10 illustrates one example of the relationship between the generated power and the output power by taking, as an example, an embodiment in which an output manner of a power supply system 100 is determined based on a magnitude relationship between output power CP at a time t and generated power CG at the time t.

Figure 7:
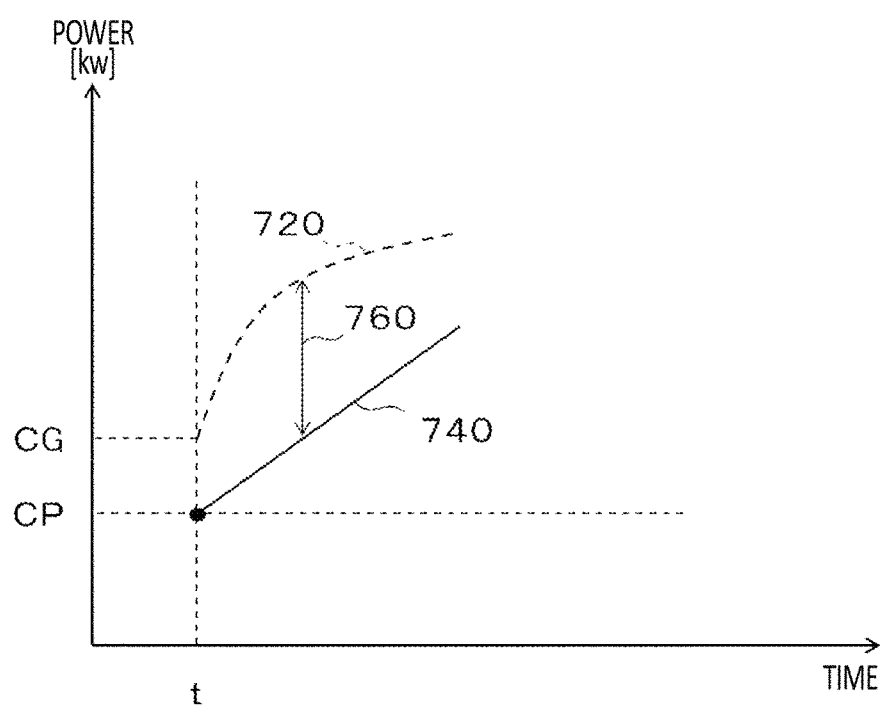
FIG. 7 schematically shows one example of a relationship between generated power and output power.

With reference to FIG. 7, one example of an operation of the power supply system 100 will be described by taking, as an example, a case where, in a time period to be described, the generated power is always greater than the output power and a difference between the generated power and the output power is always greater than a predetermined threshold value. In this case, power corresponding to a difference 760 between the generated power indicated by a power generation history 720 and the output power indicated by an output history 740 is stored in a power storage system 130.

Figure 8:
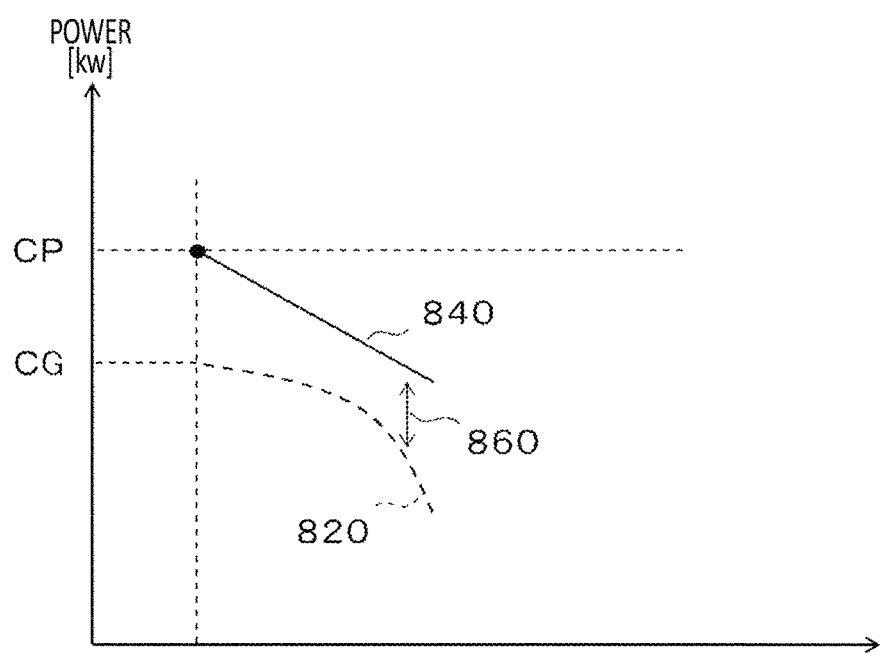
FIG. 8 schematically shows one example of a relationship between generated power and output power.

With reference to FIG. 8, one example of an operation of a power generation system 110 will be described by taking, as an example, a case where, in a time period to be described, the generated power is always smaller than the output power and a difference between the generated power and the output power is always greater than a predetermined threshold value. In this case, power corresponding to a difference 860 between the generated power indicated by a power generation history 820 and the output power indicated by an output history 840 is released from a power storage system 130.

Figure 9:
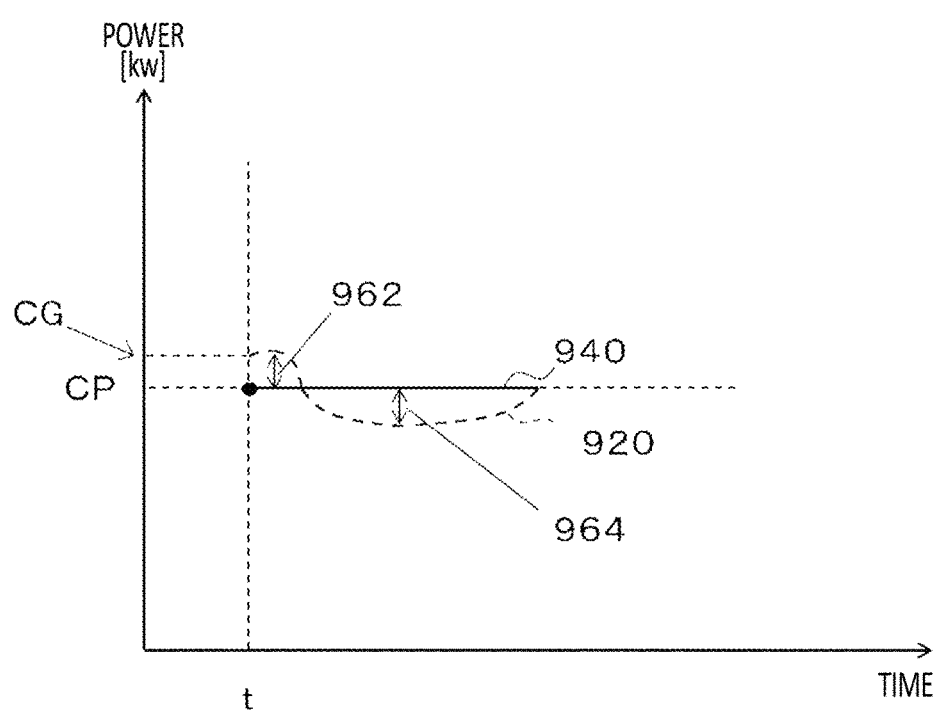
FIG. 9 schematically shows one example of a relationship between generated power and output power.

With reference to FIG. 9, one example of an operation of the power supply system 100 will be described by taking, as an example, a case where, in a time period to be described, an absolute value of a difference between the generated power and the output power is always smaller than a predetermined value. In this case, power corresponding to a difference 962 between the generated power indicated by a power generation history 920 and the output power indicated by an output history 940 is stored in a power storage system 130. On the other hand, power corresponding to a difference 964 between the generated power indicated by the power generation history 920 and the output power indicated by the output history 940 is released from the power storage system 130.

Figure 10:
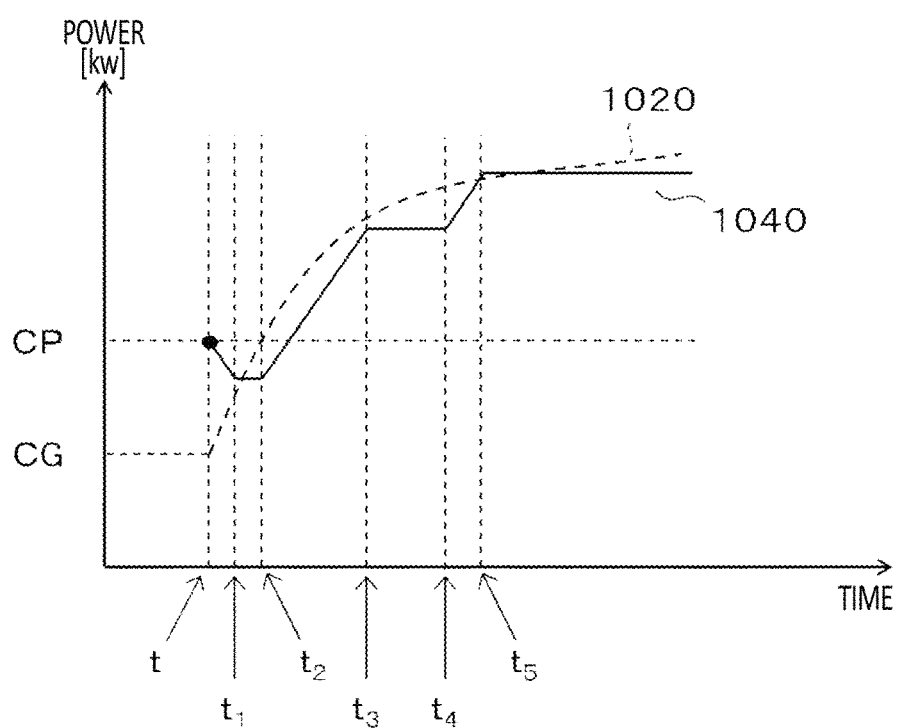
FIG. 10 schematically shows one example of a relationship between generated power and output power.

With reference to FIG. 10, one example of an operation of the power supply system 100 will be described. FIG. 10 shows one example of a power generation history 1020 of a power generation system 110, and one example of an output history 1040 of the power supply system 100.

According to the present embodiment, at a time t, generated power CG is smaller than output power CP. Therefore, a power conditioner 120 operates in a decrease mode from the time t to a time t1. Subsequently, at the time t1, the generated power CG becomes substantially the same as the output power CP, so the power conditioner 120 operates in a hold mode from the time t1 to a time t2. At the time t2, the generated power CG becomes greater than the output power CP, so the power conditioner 120 operates in an increase mode from the time t2 to a time t3.

At the time t3, the generated power CG becomes substantially the same as the output power CP, so the power conditioner 120 operates in the hold mode from the time t3 to a time t4. At the time t4, the generated power CG becomes greater than the output power CP, so the power conditioner 120 operates in the increase mode from the time t4 to a time t5. At the time t5, the generated power CG becomes substantially the same as the output power CP, so the power conditioner 120 operates in the hold mode from the time t5 onwards.

In the present embodiment, a power storage system 130 is connected between an output of the power generation system 110 and an input of the power conditioner 120, receives direct current power from the power generation system 110, and supplies the direct current power to the power conditioner 120. This allows the power storage system 130 to be charged and discharged at high speed following a short-period fluctuation in the generated power. As a result, if a remaining capacity or an SOC of the power storage system 130 is operated in an appropriate numerical range, the short-period fluctuation in the generated power may be suppressed.

Figure 11:
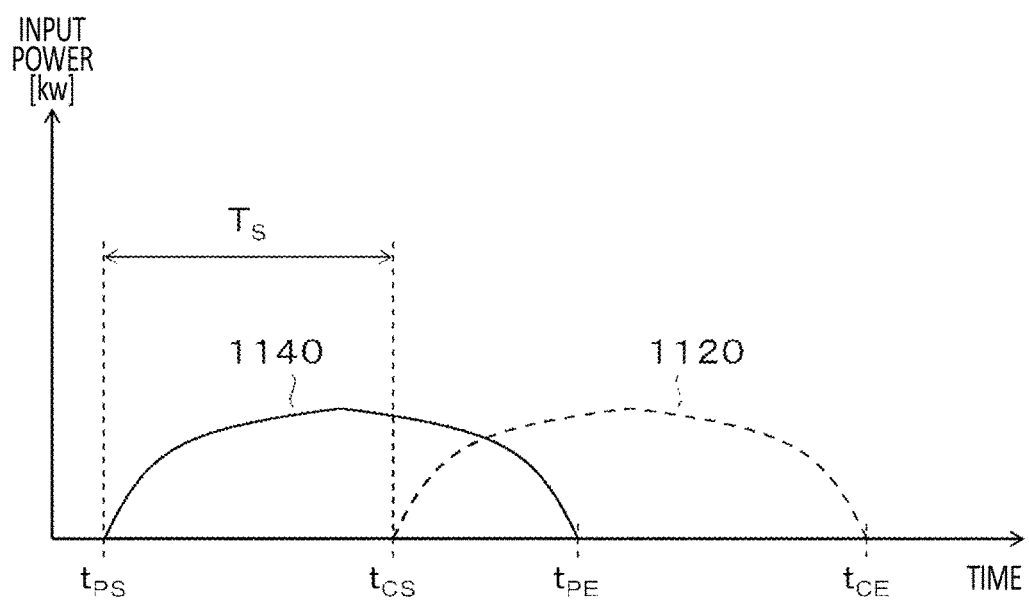
FIG. 11 schematically shows one example of a relationship between power generation prediction and an output plan.

FIG. 11 schematically shows one example of a relationship between power generation prediction and an output plan. In the present embodiment, an output plan 1140 is generated, for example, by shifting a time for a generated power prediction result 1120.

For example, a generated power prediction unit 524 derives, based on weather prediction for a time period from a time $t_{CS}$ to a time $t_{CE}$, a prediction value of generated power at each of a plurality of times included in the time period from the time $t_{CS}$ to the time $t_{CE}$. The weather prediction may include a prediction value of an amount of sunlight at each of the plurality of times, or a prediction formula for the amount of sunlight. The generated power prediction unit 524 associates information indicating each of the plurality of times included in the time period with information indicating the prediction value of the generated power at each time, to generate the prediction result 1120.

An output plan generation unit 526 determines, based on the generated power prediction result 1120, a planned value of output power at each of a plurality of times included in a time period from a time $t_{PS}$ to the time $t_{CE}$. The output plan generation unit 526 may determine, based on the generated power prediction result 1120, the planned value of the output power at each of a plurality of times included in a time period from the time $t_{PS}$ to a time $t_{PE}$. The output plan generation unit 526 associates information indicating each of the plurality of times included in the time period with information indicating the planned value of the output power at each time, to generate the output plan 1140.

In the present embodiment, the output plan generation unit 526 shifts the time for the generated power prediction result 1120, to generate the output plan 1140. An amount Ts of the shift is determined based on, for example, power supply and demand prediction at each time. The output plan generation unit 526 may obtain information indicating the power supply and demand prediction at each time from a grid management server 42 or an information provision server 44. The output plan generation unit 526 may determine the amount of the shift amount based on information indicating an actual value of a supply and demand gap at each time and a past weather pattern. Examples of the weather pattern include sunny, cloudy, rainy, and the like.

The prediction result 1120 may be one example of the prediction value of the generated power. The output plan 1140 may be one example of the planned value of the output power. The time period from the time $t_{CS}$ to the time $t_{CE}$ may be one example of a first time period. The time period from the time $t_{PS}$ to the time $t_{CE}$ may be one example of a second time period. The time period from the time $t_{PS}$ to the time $t_{PE}$ may be one example of the second time period.

One Example of Another Embodiment

In the present embodiment, one example of a power supply system 100 has been described by taking, as an example, a case where the output plan 1140 is generated by shifting the time for the generated power prediction result 1120. However, the power supply system 100 is not limited to the present embodiment. In another embodiment, the output plan 1140 is determined based on, for example, the power supply and demand prediction at each time, such that the planned value of the output power becomes greater than the prediction value of the generated power at a time when demand exceeds supply, and the planned value of the output power becomes smaller than the prediction value of the generated power at a time when demand falls below supply.

Figure 12:
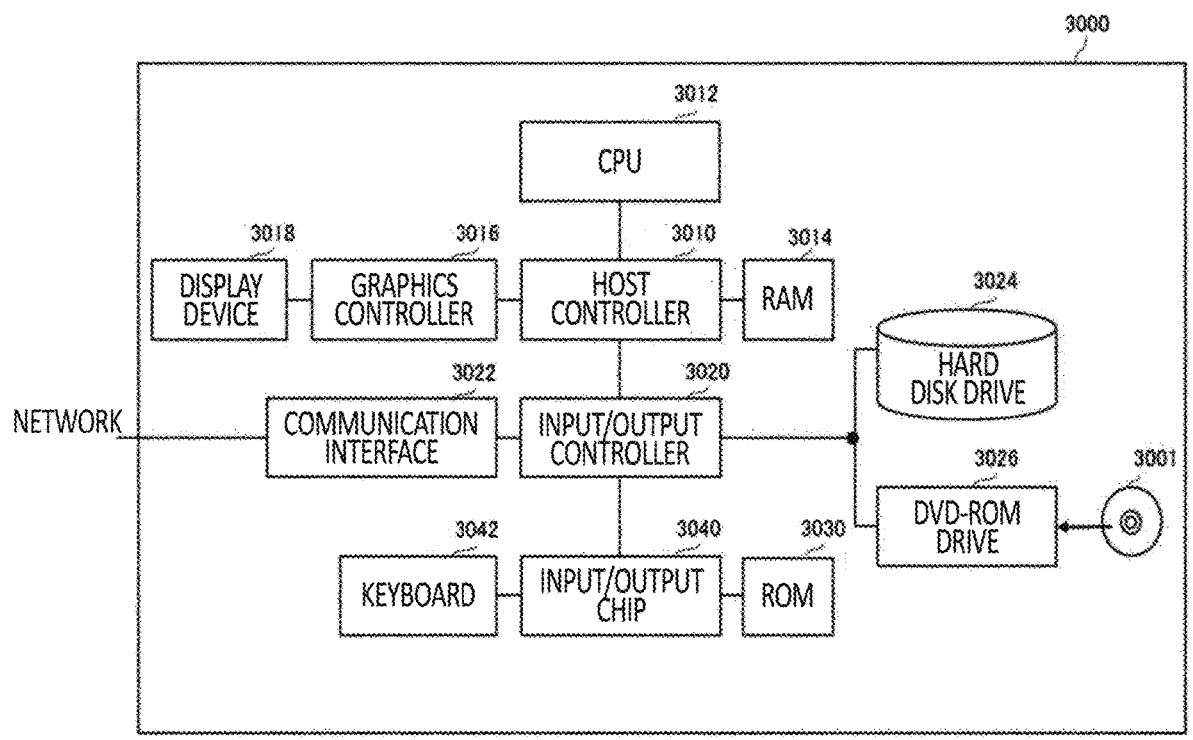
FIG. 12 schematically shows one example of a system configuration of a computer 3000.

FIG. 12 shows one example of a computer 3000 in which a plurality of aspects of the present invention may be entirely or partially embodied. At least part of a power supply system 100 may be realized by the computer 3000. For example, part of a power conditioner 120 is realized by the computer 3000. For example, part of a power storage system 130 is realized by the computer 3000. For example, at least part of a control system 140 is realized by the computer 3000. In addition, at least part of a grid management server 42 may be realized by the computer 3000. At least part of an information provision server 44 may be realized by the computer 3000.

A program that is installed in the computer 3000 can cause the computer 3000 to execute an operation associated with an apparatus according to the embodiment of the present invention or to function as one or a plurality of "units" of the apparatus, or can cause the computer 3000 to perform the operation or the one or plurality of units thereof, and/or cause the computer 3000 to execute a process according to the embodiment of the present invention or stages the process. Such a program may be executed by a CPU 3012 to cause the computer 3000 to execute specific operations associated with some or all of the blocks of flowcharts and block diagrams described in the present specification.

The computer 3000 according to the present embodiment includes the CPU 3012, a RAM 3014, a GPU 3016, and a display device 3018, which are mutually connected by a host controller 3010. The computer 3000 also includes input/output units such as a communication interface 3022, a hard disk drive 3024, a DVD-ROM drive 3026, and an IC card drive, which are connected to the host controller 3010 via an input/output controller 3020. The computer also includes legacy input/output units such as a ROM 3030 and a keyboard 3042, which are connected to the input/output controller 3020 via an input/output chip 3040.

The CPU 3012 operates in accordance with programs stored in the ROM 3030 and the RAM 3014, thereby controlling each unit. The GPU 3016 obtains image data generated by the CPU 3012 in a frame buffer or the like provided in the RAM 3014 or in itself, so that the image data is displayed on the display device 3018.

The communication interface 3022 communicates with another electronic device via a network. The hard disk drive 3024 stores the program and data to be used by the CPU 3012 in the computer 3000. The DVD-ROM drive 3026 reads a program or data from the DVD-ROM 3001, and provides the program or data to the hard disk drive 3024 via the RAM 3014. The IC card drive reads the program and data from an IC card, and/or writes the program and data to the IC card.

The ROM 3030 stores therein a boot program or the like that is executed by the computer 3000 at the time of activation, and/or a program depending on the hardware of the computer 3000. The input/output chip 3040 may also connect various input/output units to the input/output controller 3020 via a parallel port, a serial port, a keyboard port, a mouse port, or the like.

A program is provided by a computer-readable storage medium, such as the DVD-ROM 3001 or the IC card. The program is read from the computer-readable storage medium, installed into the hard disk drive 3024, RAM 3014, or ROM 3030, which are also examples of the computer-readable storage medium, and executed by the CPU 3012. The information processing described in these programs is read into the computer 3000, resulting in cooperation between a program and the various types of hardware resources. An apparatus or method may be configured by realizing an operation or processing of information in accordance with the use of the computer 3000.

For example, if communication is executed between the computer 3000 and an external device, the CPU 3012 may execute a communication program loaded in the RAM 3014 and instruct the communication interface 3022 to perform communication processing based on processing described in the communication program. Under the control of the CPU 3012, the communication interface 3022 reads send data stored in a send buffer region provided in a recording medium such as the RAM 3014, the hard disk drive 3024, the DVD-ROM 3001, or the IC card, and sends the read send data to the network, or writes reception data received from the network in a reception buffer region or the like provided on the recording medium.

In addition, the CPU 3012 may cause all or a necessary portion of a file or a database to be read into the RAM 3014, the file or the database having been stored in an external recording medium such as the hard disk drive 3024, the DVD-ROM drive 3026 (DVD-ROM 3001), the IC card, and the like, and execute various type of processing on the data on the RAM 3014. Next, the CPU 3012 may write back the processed data into an external recording medium.

A various types of information, such as various types of programs, data, tables, and databases, may be stored in the recording medium to undergo information processing. The CPU 3012 may execute, on the data read from the RAM 3014, various types of processing, including various types of operations designated by an instruction sequence of a program, which are described throughout the present disclosure, information processing, a condition judgment, a conditional branch, an unconditional branch, information search/replacement, and the like, and write back the result to the RAM 3014. In addition, the CPU 3012 may search for information in a file, a database, or the like, in the recording medium. For example, if a plurality of entries, each having an attribute value of a first attribute associated with an attribute value of a second attribute, are stored in the recording medium, the CPU 3012 may search for an entry whose attribute value of the first attribute matches a designated condition, from among the plurality of entries, and read the attribute value of the second attribute stored in the entry, thereby obtaining the attribute value of the second attribute associated with the first attribute satisfying the predetermined condition.

The above described program or software modules may be stored in the computer-readable storage medium on or near the computer 3000. In addition, a recording medium such as a hard disk or a RAM provided in a server system connected to a dedicated communication network or Internet can be used as a computer-readable storage medium, thereby providing the above program to the computer 3000 via the network.

While the present invention has been described by way of the embodiments, the technical scope of the present invention is not limited to the embodiments. It is apparent to persons skilled in the art that various alterations or improvements can be made to the embodiments. In addition, the matters described with regard to the specific embodiment can be applied to other embodiments with a range without causing technical contradictions. It is also apparent from the described scope of the claims that the embodiments added with such alterations or improvements can be included the technical scope of the present invention.

The operations, procedures, steps, stages, or the like of each process performed by a device, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: communication network; 20: power grid; 30: power distribution board; 32: load; 42: grid management server; 44: information provision server; 100: power supply system; 110: power generation system; 112: photovoltaic power generation panel; 114: connection unit; 116: power collection board; 118: power amount meter; 120: power conditioner; 122: power amount meter; 130: power storage system; 132: power amount meter; 140: control system; 202: power adjustment circuit; 204: control unit; 210: DC input terminal; 230: inverter; 232: voltmeter; 234: ammeter; 236: voltmeter; 238: ammeter; 240: grid interconnection unit; 242: interconnection side switch; 244: interconnection side breaker; 246: ammeter; 250: AC output terminal; 264: inverter control unit; 266: grid interconnection control unit; 310: storage unit; 312: contract information storage unit; 314: control condition storage unit; 316: output history storage unit; 320: control target determination unit; 332: output current control unit; 334: output voltage control unit; 510: comparison target obtainment unit; 512: generated power value obtainment unit; 514: planned value obtainment unit; 522: weather information obtainment unit; 524: generated power prediction unit; 526: output plan generation unit; 530: output power value obtainment unit; 540: comparison unit; 550: power storage state obtainment unit; 560: output manner determination unit; 570: target value determination unit; 620: output history; 642: dotted line; 644: dotted line; 646: dotted line; 720: power generation history; 740: output history; 760: difference; 820: power generation history; 840: output history; 860: difference; 920: power generation history; 940: output history; 962: difference; 964: difference; 1020: power generation history; 1040: output history; 1120: prediction result; 1140: output plan; 3000: computer; 3001: DVD-ROM; 3010: host controller; 3012: CPU; 3014: RAM; 3016: GPU; 3018: display device; 3020: input/output controller; 3022: communication interface; 3024: hard disk drive; 3026: DVD-ROM drive; 3030: ROM; 3040: input/output chip; and 3042: keyboard.

What is claimed is:

1. A control apparatus for controlling output power, which is power outputted by a power supply apparatus to a power grid, wherein
the control apparatus comprises an output control unit which causes the power supply apparatus to operate in any one mode of (i) a first mode in which magnitude of the output power is increased such that an absolute value of a fluctuation rate indicating a ratio of a fluctuation amount of the output power per unit time to a rated output of the power supply apparatus is equal to or smaller than a first threshold value or smaller than the first threshold value, (ii) a second mode in which the magnitude of the output power is decreased such that the absolute value of the fluctuation rate is equal to or smaller than a second threshold value or smaller than the second threshold value, and (iii) a third mode in which the magnitude of the output power is maintained such that the absolute value of the fluctuation rate is equal to or smaller than a third threshold value or smaller than the third threshold value, and the third threshold value is smaller than the first threshold value and the second threshold value.

2. The control apparatus according to claim 1, wherein the rated output of the power supply apparatus is determined based on (i) a contract for the power supply apparatus to supply power to the power grid, or (ii) a maximum value of ability of the power supply apparatus to supply power to the power grid.

3. The control apparatus according to claim 1, wherein the output control unit:

controls, in the first mode, the output power such that the output power increases at a first fluctuation rate;

controls, in the second mode, the output power such that the output power decreases at a second fluctuation rate; and controls, in the third mode, the output power such that the output power does not substantially fluctuate, and a difference between an absolute value of the first fluctuation rate and an absolute value of the second fluctuation rate is smaller than a predetermined value.

4. The control apparatus according to claim 1, wherein the power supply apparatus includes:

a power generation apparatus configured to be capable of outputting direct current power;

a power storage apparatus configured to be capable of inputting and outputting direct current power; and a power conversion apparatus which converts the direct current power outputted by at least one of the power generation apparatus or the power storage apparatus into alternating current power, and the control apparatus controls the power conversion apparatus, to adjust the magnitude of the output power.

5. The control apparatus according to claim 4, further comprising:

a generated power value obtainment unit which obtains information indicating a present value of generated power, which is power outputted by the power generation apparatus; and an output power value obtainment unit which obtains information indicating a present value of the output power, wherein the output control unit has an output manner determination unit which determines an operation mode of the power supply apparatus based on the present value of the generated power and the present value of the output power.

6. The control apparatus according to claim 5, wherein the output manner determination unit:

(a) determines to cause the power supply apparatus to operate in the first mode if the present value of the generated power is greater than the present value of the output power; and/or (b) determines to cause the power supply apparatus to operate in the second mode if the present value of the generated power is smaller than the present value of the output power.

7. The control apparatus according to claim 5, wherein the output manner determination unit determines to cause the power supply apparatus to operate in the third mode, (i) if a difference between the present value of the generated power and the present value of the output power is smaller than a fourth threshold value, (ii) if a ratio of the present value of the output power to the present value of the generated power falls within a predetermined numerical range, or (iii) if an output of the power conversion apparatus reaches a predetermined upper limit value.

8. The control apparatus according to claim 5, further comprising a power storage state obtainment unit which obtains information indicating a remaining capacity or an SOC of the power storage apparatus, wherein the output manner determination unit:

(a) if the present value of the generated power is greater than the present value of the output power, (i) determines to cause the power supply apparatus to operate in the first mode when the remaining capacity or the SOC of the power storage apparatus is greater than a fifth threshold value, and (ii) determines to cause the power supply apparatus to operate in the third mode when the remaining capacity or the SOC of the power storage apparatus is smaller than the fifth threshold value; and/or (b) if the present value of the generated power is smaller than the present value of the output power, (i) determines to cause the power supply apparatus to operate in the second mode when the remaining capacity or the SOC of the power storage apparatus is smaller than a sixth threshold value, and (ii) determines to cause the power supply apparatus to operate in the third mode when the remaining capacity or the SOC of the power storage apparatus is greater than the sixth threshold value, and the fifth threshold value is smaller than the sixth threshold value.

9. The control apparatus according to claim 4, further comprising a power storage state obtainment unit which obtains information indicating a remaining capacity or an SOC of the power storage apparatus, wherein the output control unit has an output manner determination unit which determines an operation mode of the power supply apparatus based on the remaining capacity or the SOC of the power storage apparatus.

10. The control apparatus according to claim 4, further comprising:

a planned value obtainment unit which obtains information indicating a planned value of the output power of the power supply apparatus at a specific time; and an output power value obtainment unit which obtains information indicating a present value of the output power, wherein the output control unit has an output manner determination unit which determines an operation mode of the power supply apparatus based on the planned value of the output power and the present value of the output power.

11. The control apparatus according to claim 10, wherein the output manner determination unit:

(a) determines to cause the power supply apparatus to operate in the first mode if the planned value of the output power is greater than the present value of the output power; and/or (b) determines to cause the power supply apparatus to operate in the second mode if the planned value of the output power is smaller than the present value of the output power.

12. The control apparatus according to claim 10, wherein the output manner determination unit determines to cause the power supply apparatus to operate in the third mode, (i) if a difference between the planned value of the output power and the present value of the output power is smaller than a fourth threshold value, (ii) if a ratio of the present value of the output power to the planned value of the output power falls within a predetermined numerical range, or (iii) if an output of the power conversion apparatus reaches a predetermined upper limit value.

13. The control apparatus according to claim 10, further comprising a power storage state obtainment unit which obtains information indicating a remaining capacity or an SOC of the power storage apparatus, wherein
the output manner determination unit:
(a) if the planned value of the output power is greater than the present value of the output power,
(i) determines to cause the power supply apparatus to operate in the first mode when the remaining capacity or the SOC of the power storage apparatus is greater than a fifth threshold value, and
(ii) determines to cause the power supply apparatus to operate in the third mode when the remaining capacity or the SOC of the power storage apparatus is smaller than the fifth threshold value; and/or
(b) if the planned value of the output power is smaller than the present value of the output power,
(i) determines to cause the power supply apparatus to operate in the second mode when the remaining capacity or the SOC of the power storage apparatus is smaller than a sixth threshold value, and
(ii) determines to cause the power supply apparatus to operate in the third mode when the remaining capacity or the SOC of the power storage apparatus is greater than the sixth threshold value, and
the fifth threshold value is smaller than the sixth threshold value.

14. The control apparatus according to claim 10, further comprising:
a weather information obtainment unit which obtains weather information for an area where the power generation apparatus is installed;
a generated power prediction unit which derives, based on the weather information obtained by the weather information obtainment unit, a prediction value of a generated power, which is power outputted by the power generation apparatus, at each of a plurality of times included in a first time period; and
an output plan generation unit which determines, based on the prediction value of the generated power derived by the generated power prediction unit, the planned value of the output power of the power supply apparatus at each of a plurality of times included in a second time period, wherein
the power generation apparatus includes a photovoltaic power generation apparatus, and
the output manner determination unit determines the operation mode of the power supply apparatus based on the planned value of the output power determined by the output plan generation unit and on the present value of the output power obtained by the output power value obtainment unit.

15. The control apparatus according to claim 1, wherein the first threshold value of the fluctuation rate is equal to or smaller than 5%/minute.

16. The control apparatus according to claim 1, wherein the rated output of the power supply apparatus is determined based on a maximum value of ability of the power supply apparatus to supply power to the power grid.

17. A power conversion system comprising:
the control apparatus according to claim 4; and
the power conversion apparatus.

18. A power supply apparatus comprising:
the control apparatus according to claim 4;
the power generation apparatus;
the power storage apparatus; and
the power conversion apparatus.

19. A non-transitory computer-readable storage medium having stored thereon a program that causes a computer to function as a control apparatus for controlling output power, which is power outputted by a power supply apparatus to a power grid, wherein
the program causes the computer to function as an output control unit which causes the power supply apparatus to operate in any one mode of (i) a first mode in which magnitude of the output power is increased such that an absolute value of a fluctuation rate indicating a ratio of a fluctuation amount of the output power per unit time to a rated output of the power supply apparatus is equal to or smaller than a first threshold value or smaller than the first threshold value, (ii) a second mode in which the magnitude of the output power is decreased such that the absolute value of the fluctuation rate is equal to or smaller than a second threshold value or smaller than the second threshold value, and (iii) a third mode in which the magnitude of the output power is maintained such that the absolute value of the fluctuation rate is equal to or smaller than a third threshold value or smaller than the third threshold value, and
the third threshold value is smaller than the first threshold value and the second threshold value.

20. A control method for controlling output power, which is power outputted by a power supply apparatus to a power grid, wherein
the control method has controlling an output by causing the power supply apparatus to operate in any one mode of (i) a first mode in which magnitude of the output power is increased such that an absolute value of a fluctuation rate indicating a ratio of a fluctuation amount of the output power per unit time to a rated output of the power supply apparatus is equal to or smaller than a first threshold value or smaller than the first threshold value, (ii) a second mode in which the magnitude of the output power is decreased such that the absolute value of the fluctuation rate is equal to or smaller than a second threshold value or smaller than the second threshold value, and (iii) a third mode in which the magnitude of the output power is maintained such that the absolute value of the fluctuation rate is equal to or smaller than a third threshold value or smaller than the third threshold value, and
the third threshold value is smaller than the first threshold value and the second threshold value.

* * * * *